US011361237B2

(12) United States Patent
Agrawal et al.

(10) Patent No.: US 11,361,237 B2
(45) Date of Patent: Jun. 14, 2022

(54) METHODS AND SYSTEMS FOR PERFORMING PREDICTIVE MAINTENANCE ON VEHICLE COMPONENTS TO PREVENT CASCADING FAILURE IN A TRANSPORTATION SYSTEM

(71) Applicant: CONDUENT BUSINESS SERVICES, LLC, Dallas, TX (US)

(72) Inventors: Poorvi Agrawal, Bangalore (IN); Bhupendra S. Solanki, Madhya Pradesh (IN); Narayanan Unny, Bangalore (IN)

(73) Assignee: Conduent Business Services, LLC, Florham Park, NJ (US)

( * ) Notice: Subject to any disclaimer, the term of this patent is extended or adjusted under 35 U.S.C. 154(b) by 992 days.

(21) Appl. No.: 16/047,452

(22) Filed: Jul. 27, 2018

(65) Prior Publication Data

US 2020/0034734 A1 Jan. 30, 2020

(51) Int. Cl.
*G06N 7/00* (2006.01)
*G07C 5/00* (2006.01)
(Continued)

(52) U.S. Cl.
CPC .......... *G06N 7/005* (2013.01); *G05B 23/0278* (2013.01); *G06N 20/00* (2019.01); *G07C 5/006* (2013.01)

(58) Field of Classification Search
CPC .... G06N 7/005; G06N 20/00; G05B 23/0278; G07C 5/006
(Continued)

(56) References Cited

U.S. PATENT DOCUMENTS 7,013,411 B2 3/2006 Kallela et al.
8,118,223 B2 * 2/2012 Hammad ........... G06Q 20/3278
235/382
(Continued)

FOREIGN PATENT DOCUMENTS

WO 2012/060883 A2 5/2012

OTHER PUBLICATIONS

Bialek et al., "Benchmarking and Validation of Cascading Failure Analysis Tools: IEEE Working Group on Understanding, Prediction, Mitigation and Restoration of Cascading Failures ," IEEE Transactions on Power Systems, IEEE Working Group, pp. 1-14 (2016).

(Continued)

*Primary Examiner* — Aditya S Bhat
(74) *Attorney, Agent, or Firm* — Jones Robb, PLLC

(57) ABSTRACT

Systems, methods, and processing nodes predicting and perform preventive maintenance in a transportation system. Predicting and performing preventive maintenance in a transportation system includes determining historical data for electronic devices in the transportation system. Predicting and performing preventive maintenance also includes determining dependencies of the electronic devices based on the historical data. Predicting and performing preventive maintenance includes determining a likelihood of a fault in the target electronic device during a time period based on the dependencies of the electronic devices and a mutual probability of failure of the target electronic device and parent electronic devices associated with the target electronic device. Predicting and performing preventive maintenance also includes initiating preemptive maintenance on the target electronic device based on the likelihood of the fault.

20 Claims, 7 Drawing Sheets

(51) Int. Cl.
 *G06N 20/00* (2019.01)
 *G05B 23/02* (2006.01)
(58) Field of Classification Search
 USPC .......................................................... 702/184
 See application file for complete search history.

(56) References Cited

U.S. PATENT DOCUMENTS

| | | | |
|---|---|---|---|
| 9,519,921 B2* | 12/2016 | Wei | G06Q 10/02 |
| 2006/0157563 A1* | 7/2006 | Marshall | G07F 7/1008 |
| | | | 235/382 |
| 2015/0195192 A1 | 7/2015 | Vasseur et al. | |
| 2016/0131605 A1 | 5/2016 | Hamrouni et al. | |

OTHER PUBLICATIONS

Zhao et al., "Deep Learning and Its Applications to Machine Health Monitoring: A Survey," Journal of LATEX Class Files, 14:8:1-14 (Aug. 2015).

Malhotra et al., "Multi-Sensor Prognostics using an Unsupervised Health Index based on LSTM Encoder-Decoder," Presented at 1st ACM SIGKDD Workshop on Machine Learning for Prognostics & Health Management, San Francisco, CA, arXig.org; arXiv:1608.06154 [cs.LG] (2016).

Pahwa et al., "Topological Analysis and Mitigation Strategies for Cascading Failures in Power Grid Networks," arXiv preprint, arXiv.org; arXiv:1212.5620, pp. 1-12 (2012).

\* cited by examiner

METHODS AND SYSTEMS FOR PERFORMING PREDICTIVE MAINTENANCE ON VEHICLE COMPONENTS TO PREVENT CASCADING FAILURE IN A TRANSPORTATION SYSTEM

TECHNICAL BACKGROUND

Managing a transportation system is one of the biggest challenges of every city, town, etc. in any part of the world. The transportation system is a crucial part of the solution to the nation's economic, energy, and environmental challenges. With a fast-growing population, the need for reliable and stable transportation system is more important than ever. In transportation systems, electronic ticketing systems have taken over cash payment for the use of the transportation system. In the electronic ticketing systems, a ticketing process involves an individual tapping the card on devices installed on a public transport, e.g. bus, while boarding and leaving it. The fare is then deducted automatically from the card depending upon the distance traveled on board the public transport.

One of the most important elements for proper functioning of the ticketing system is the health of the devices. Two events can occur during the failure of the ticketing system. In a first event, an error can occur at a device in the ticketing system. In a second event, a cascading failure can occur in the ticketing system. Determining the source of the error requires the knowledge of the ticketing system's internal hardware and software dependencies. If the internal dependencies are unavailable, finding out those dependencies can increase the stability of the system. Any form of failure of a device can require preemptive maintenance of that the device which in turn will increase the reliability of the ticketing system. Determining the true internal dependencies, however, may not be possible.

Overview

Exemplary embodiments described herein include systems, methods, and processing nodes for predicting and performing preventive maintenance in a transportation system. An exemplary method for predicting and performing preventive maintenance in a transportation system includes determining historical data for electronic devices in the transportation system. The electronic devices communicate in a network in the transportation system, and the historical data includes historical device failures of the electronic devices. The method also includes determining dependencies of the electronic devices based on the historical data. Determining the dependencies includes generating a graph of parent-child dependencies of the electronic devices. Additionally, the method includes selecting a target electronic device from the electronic devices to predict a fault during a time period. Further, the method includes determining a likelihood of a fault in the target electronic device during the time period based on the dependencies of the electronic devices and a mutual probability of failure of the target electronic device and parent electronic devices associated with the target electronic device. The method also includes initiating preemptive maintenance on the target electronic device based on the likelihood of the fault.

An exemplary system for predicting and performing preventive maintenance in a transportation system includes a processing node and a processor coupled to the processing node. The processor configures the processing node to perform operations including determining historical data for electronic devices in the transportation system. The electronic devices communicate in a network in the transportation system, and the historical data includes historical device failures of the electronic devices. The method also includes determining dependencies of the electronic devices based on the historical data. Determining the dependencies includes generating a graph of parent-child dependencies of the electronic devices. Additionally, the method includes selecting a target electronic device from the electronic devices to predict a fault during a time period. Further, the method includes determining a likelihood of a fault in the target electronic device during the time period based on the dependencies of the electronic devices and a mutual probability of failure of the target electronic device and parent electronic devices associated with the target electronic device. The method also includes initiating preemptive maintenance on the target electronic device based on the likelihood of the fault.

A non-transitory computer readable medium stores instructions for causing one or more processors to perform a method for predicting and performing preventive maintenance in a transportation system. The method includes determining historical data for electronic devices in the transportation system. The electronic devices communicate in a network in the transportation system, and the historical data includes historical device failures of the electronic devices. The method also includes determining dependencies of the electronic devices based on the historical data. Determining the dependencies includes generating a graph of parent-child dependencies of the electronic devices. Additionally, the method includes selecting a target electronic device from the electronic devices to predict a fault during a time period. Further, the method includes determining a likelihood of a fault in the target electronic device during the time period based on the dependencies of the electronic devices and a mutual probability of failure of the target electronic device and parent electronic devices associated with the target electronic device. The method also includes initiating preemptive maintenance on the target electronic device based on the likelihood of the fault.

DETAILED DESCRIPTION

According to embodiment of the present disclosure, a system and method model failure prediction in a network of devices, for example, a network of devices in a transportations system, and schedules preventive maintenance of the devices based on the failure prediction. The failure prediction of devices operates without evaluating topology of the network which in most of the cases may be unavailable. For example, the occurrence of an error in a particular device of a system may advance to different branches of the system, which may lead to the cascading failure. Cascading failure can persist in a network of interdependent devices. Some examples of this kind of network are power grid network, a network of sensors, a network of routers, transportation system, etc. Cascading failure can be defined as subsequent failure of devices due to failure in some of the devices in a network. Thus, in these networks, if a device fails, it may cause failure of one or more devices over time, reducing reliability and increasing the cost of maintenance. This creates a need for a system which can predict the cascade of failures consistently and accurately. If the system predicts cascading route of failure, preemptive measures can be taken to reduce damages. For example, in power grid network if the system is predicting failure in some grid which might cause a cascading effect, better maintenance of this grid will make the network more reliable.

In embodiments, the system and method utilizes a model that considers the dependencies information among the devices, which can predict cascading failures in the network of devices. In particular, modeling can be extended to detect the dependencies between the devices in a network and use the dependencies to predict eventual failure of devices. This allows the scheduling, regulation, and performance of pre-emptive maintenance. As direct information about dependencies among devices is often unavailable, the system and method uses a dependency extraction module to extract the dependencies (i.e., failure of device 1 triggering the failure in device 2) using mutual information between devices from a proprietary dataset. The system and method uses the dependencies extracted to predict the failure of devices.

These and additional operations are further described with respect to the embodiments depicted in FIGS. 1-4 below.

Figure 1A:
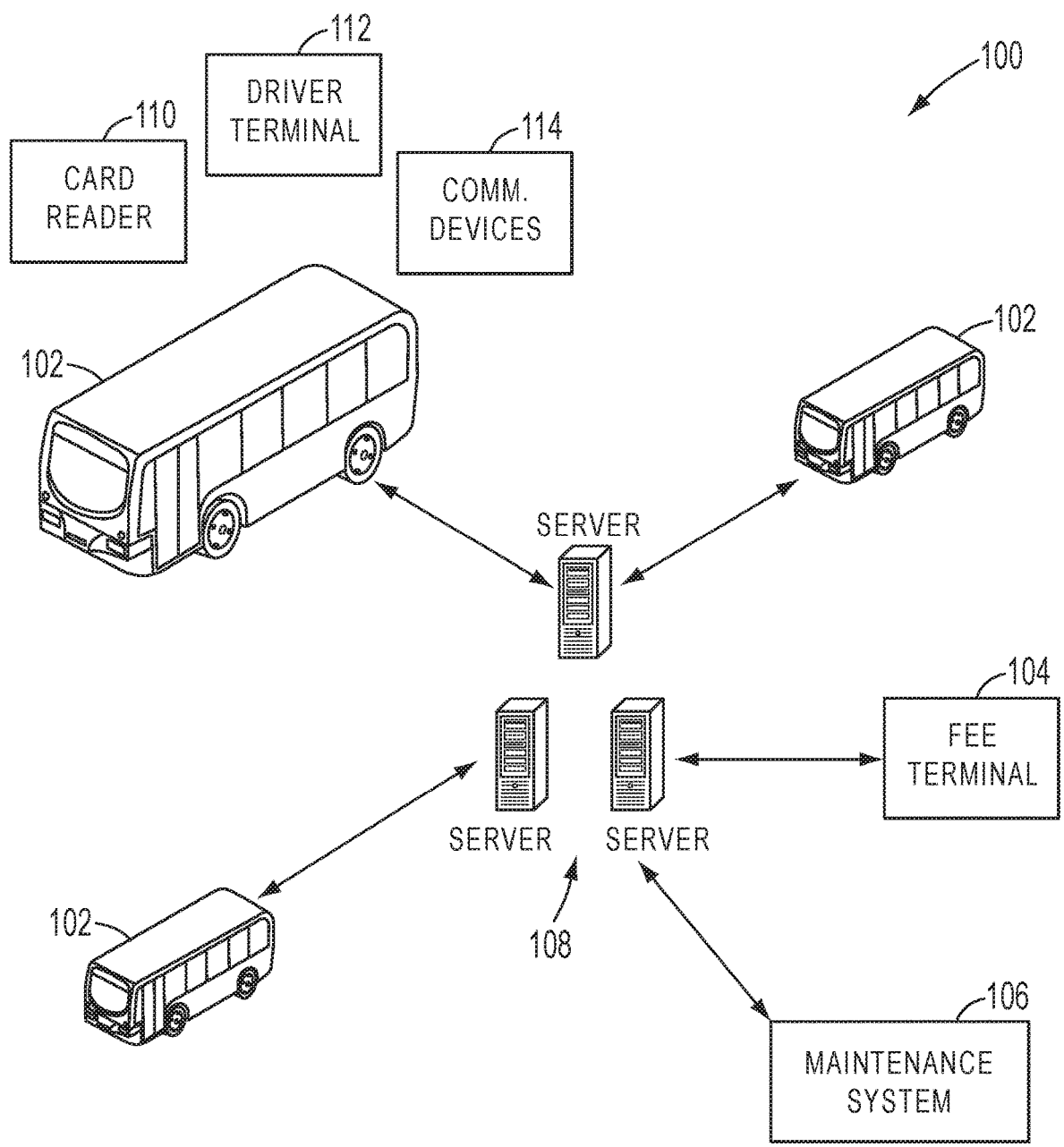
FIG. 1A depicts an example of a transportation system, according to various embodiments of the present disclosure.

FIG. 1 illustrates an example of a transportation system 100, according to embodiments of the present disclosure. While the transportation system 100 illustrates various components, one skilled in the art will realize that additional components can be added and existing components can be removed.

As illustrated in FIG. 1, the transportation system 100 includes one or more transport vehicles 102, e.g., busses, one or more fee terminals 104, a maintenance system 106, and one or more servers 108. The transportations system 100 can represent any type of transportation system that operates a fleet of transport vehicles 102. While FIG. 1 illustrates the transport vehicles 102 as buses, one skilled in the art will realize that the transport vehicles 102 can be any type of transport vehicles such as trains, cars, trams, etc.

The transport vehicles 102 include a number of electronic devices that facilitate offering transportation services to customers. The transport vehicle 102 includes a card reader 110, a driver terminal 112, and communication devices 114. For example, a customer of the transportation system 100 can possess a smart card that store a monetary value that can be used to travel in the transport vehicles 102. The customer can add value to the smart card using the fee terminal 104 or other computerized system. The value stored on smart card can be managed by the servers 108, for example, a value stored on the smart card can be associated with an identifier of the smart card. Once a customer enters and leaves a transport vehicle 102, the card reader 110 can read the identifier of the smart card and communicate with the servers 108 to determine if funds are available, deduct the funds corresponding to a fare for a trip, and update the value on the smart card. The card reader 110 can communicate with the servers 114 using the communication devices 114, for example, modems, wireless transmitter, and the like. A successful payment of funds can be displayed to the driver on a driver terminal 112.

The transportation system 106 also includes a maintenance system 106. The maintenance system 106 is configured to model and predict potential failures in the devices of the transportation system 100, e.g., the fee terminal 104, the servers 108, the card reader 110, the driver terminal 112, and the communication devices 114. In embodiments, the maintenance system 106 is configured to utilize a model that considers dependencies information among the devices, e.g., the fee terminal 104, the servers 108, the card reader 110, the driver terminal 112, and the communication devices 114, which can predict cascading failures in the network of devices. Modeling used by the maintenance system 106 can be extended to detect the dependencies between the devices in a transportation network 100 and use the dependencies to predict eventual failure of devices. Based on the prediction, the maintenance system 106 can perform the scheduling, regulation, and performance of preemptive maintenance of the devices, e.g., the fee terminal 104, the servers 108, the card reader 110, the driver terminal 112, and the communication devices 114. As direct information about dependencies among devices is often unavailable, the maintenance system 106 extracts the dependencies (i.e., failure of device 1 triggering the failure in device 2) using mutual information between devices from a proprietary dataset, for example, historical data of failures in the past. The maintenance system 106 uses the dependencies extracted to predict the failure of devices.

In embodiments, to model the failure of devices, the maintenance system 106 utilizes a concept of probabilistic graphical model (PGM). The PGM can be defined as the graphical model which expresses the conditional dependence structure between a set of random variables. The PGM takes advantage of correlation between random variables to build the dependency graph. In general, there are two classes of graphical model: directed and undirected. In one embodiment, the maintenance system 106 utilizes a directed model, which assigns direction between nodes in the dependency graph that in turn defines the conditional dependence between the devices. For example, the notion of conditional independence, which can be used in the model of the maintenance system 106, can be defined as follows.

Let X, Y, Z be the set of random variables. X is conditionally independent of Y given Z if $$P(X=x, Y=y|Z=z)=P(X=x|Z=z)P(Y=y|Z=z) \quad (1)$$

for all values of x, y, z.

Figure 1B:
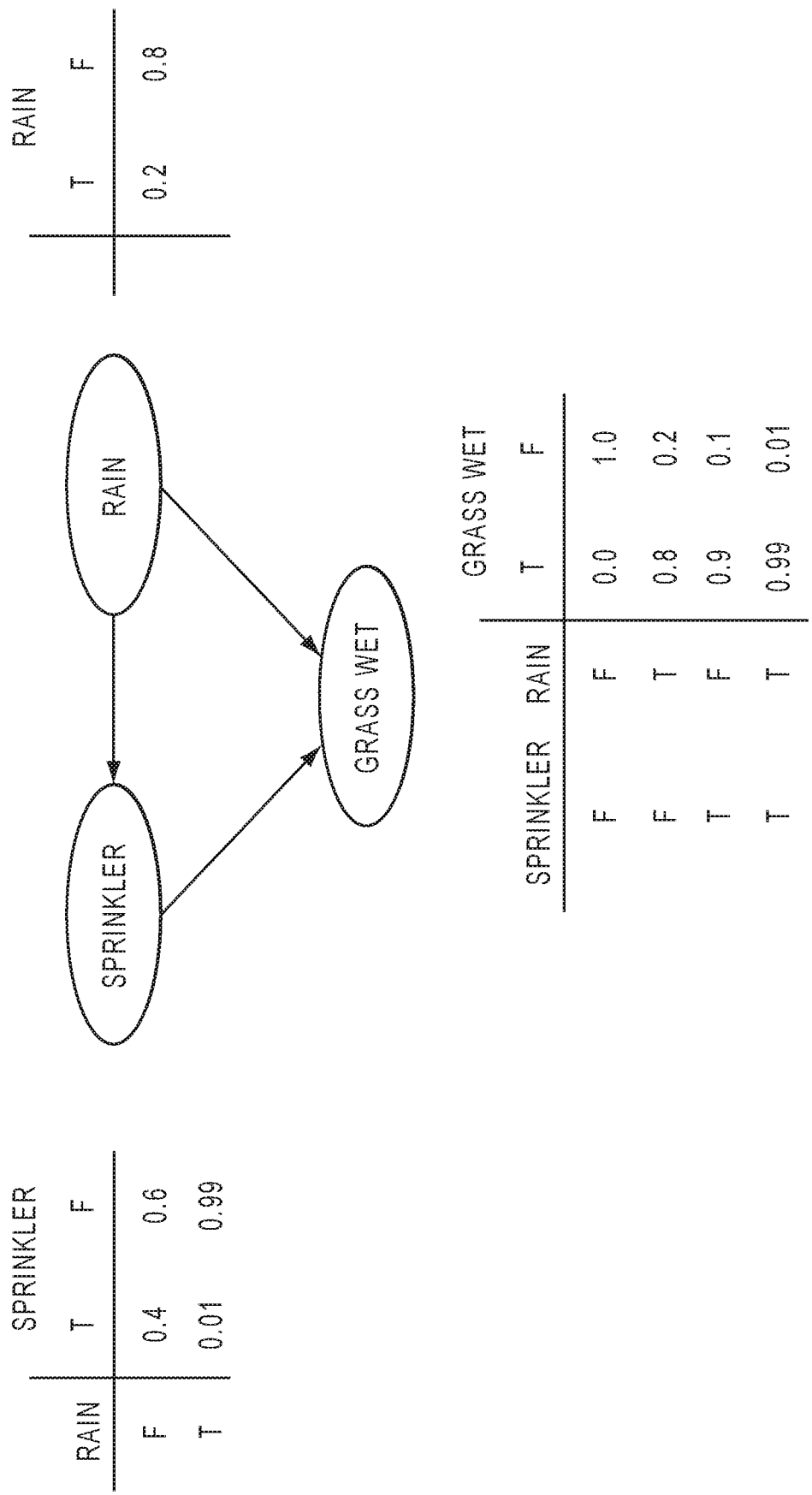
FIG. 1B depicts an example of a directed acyclic graph, according to various embodiments of the present disclosure.

A Bayesian network is a probabilistic graphical model that represents a set of random variables and their conditional dependence by a directed acyclic graph (DAG), an example of which is illustrated in FIG. 1B. For example, as illustrated in FIG. 1B, a basic Bayesian network can include events rain, sprinkler, and grass wet. From FIG. 1B, the dependencies show that rain has a direct effect on the usage of sprinkler. Also, rain and sprinkler both causes the grass to be wet. FIG. 1B can be viewed as a DAG and can be seen as a Bayesian network. Joint probability of the network can be written as:

$$P(G,S,R)=P(G|S,R)P(S|R)P(R) \quad (2)$$

where G is grass wet, R is rain and S is sprinkler.

In embodiments, the maintenance system 106 utilizes devices dependencies along with the Bayesian model to predict failure of devices in the transportation system 100, as further described below in FIG. 1C. For example, the maintenance system 106 can predict failures of devices for the future month considering the past month's Parent-Child relationship among devices (e.g., card reader 110, driver terminal 112, and communication devices 114 on buses 102; fee terminals 104; servers 108, etc.). These Parent-Child relationships define how failure will be propagated in devices of the transportation system 100 and provides a means to arrange maintenance activities properly to improve reliability and stability of the transportation network.

Figure 1C:
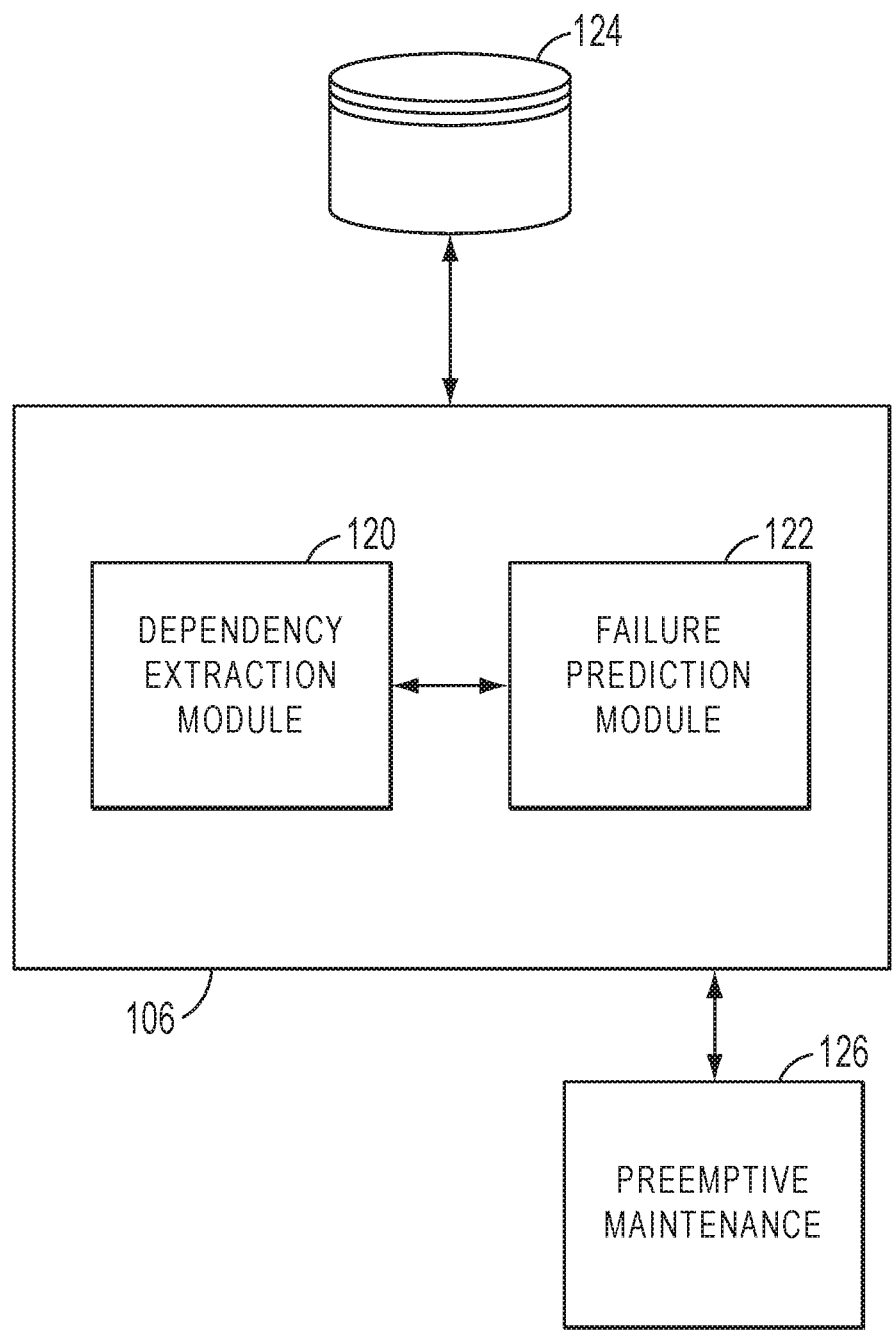
FIG. 1C depicts an example of a maintenance system, according to various embodiments of the present disclosure.

FIG. 1C illustrates a diagram of an example of the maintenance system 106. As illustrated, the maintenance system 106 includes a dependency extraction module 120 and a failure prediction module 122. As direct information about dependencies among devices is often unavailable, the dependency extraction module 120 extracts the dependencies (i.e., failure of device 1 triggering the failure in device 2) using mutual information between devices from a database 124, for example, historical data of device failures in the past. The failure prediction module 122 uses the dependencies extracted to predict the failure of devices. The prediction of the failure of the devices can be utilized to perform preemptive maintenance 126.

The database 124 can store data relating operational history of each device (e.g., card reader 110, driver terminal 112, and communication devices 114 on buses 102; fee terminals 104; servers 108, etc.) associated with a unique ID for each device. For example, the database 124 can store, associated with the unique ID of each device, a time of a failure, a time of recovery of the failure, a number of hours of the failure, etc. The database 124 can store the data in any type of data structure.

In the processes used by the maintenance system 106, the transportation system 100 has unique IDs assigned to each device (e.g., card reader 110, driver terminal 112, and communication devices 114 on buses 102; fee terminals 104; servers 108, etc.) in the network. For example, if the transportation system 100 has three devices and the devices can be labeled $x_1$, $x_2$ and $x_3$. In the processes, "parent child relationship" denotes that an outcome of $x_3$ is dependent on values of $x_1$ and $x_2$ if $x_3$ is a child ID and $x_1$, $x_2$ are parent IDs.

For the model utilized by the maintenance system 106, the following assumptions can be applied:

1. Probability of observing event (ID) $x_1$ given $x_3$ is independent of probability of observing event (ID) $x_2$ given $x_3$ i.e. $x_1$ is conditionally independent of $x_2$ given $x_3$. Hence from equation 1, the probability can be given by:

$$P(x_1, x_2 | x_3) = P(x_1 | x_3) P(x_2 | x_3) \qquad (3)$$

2. If the probability of observing event (ID) $x_1$ given $x_3$ is zero then we are changing it to a small number which is $e^{-5}$.

3. For the model, ID's can be child ID that have failed 4 times or more in period of time, e.g., three months (for which we have the data).

Based on this, the dependency extraction module 120, using the model, generates parent-child relationship matrix and probability matrix while training, and then the failure prediction module 122, using these matrices, forecasts failure of nodes, e.g., devices in the transportation system 100.

The dependency extraction module 120 can perform evaluation of parent-child dependencies among devices in a mathematical way. For example, the maintenance system 106 is to predict the failure of a device Id 'c' for the next 'm' days. Additionally, for example, the transportation system 100 has 'T' total number of unique Ids in a training set. So, out of 'T', the dependency extraction module 120 can selected 'n' unique Ids say '$x_1$', '$x_2$' . . . '$x_n$', based on the mutual information between unique Id's and device Id 'c', from the database 124. Here, mutual information (MI) of two random variables is the measure of the mutual dependence between those two variables. The dependency extraction module 120 performs this step to get those IDs which might be influencing or influenced by failure of 'c'. From this step, the dependency extraction module 120 can extract that parent ID's ($x_1$, $x_2$ . . . ) for child ID 'c' which have a MI score greater than some threshold. The dependency extraction module 120 can perform this step for all the IDs present in the database 124 to generate a matrix containing parent child dependencies.

The failure prediction module 122 uses the dependencies extracted from the above dependency extraction module 120 to predict the failure of devices using Bayesian model. There is a matrix, say 'P', of size n×5 where n is the number of unique parent ids, that is generated during the method which contains the probabilities of parent Ids failing given child Id 'C's' condition. Table 1 represents the format of conditional probability matrix. For the ease of understanding, the failure prediction module 122 can define the following notations:

1. Probability of a parent id 'x' failing given child id 'c' has failed=$P(x=1|c=1)$ 2. Probability of a parent id 'x' not failing given child id 'c' has failed=$P(x=0|c=1)$ Probability of a parent id 'x' failing given child id 'c' has not failed=$P(x=1|c=0)$ Probability of a parent id 'x' not failing given child id 'C' has not failed=$P(x=0|c=0)$

TABLE 1

Conditional Probability Table

| ID | $P(p = 1|c = 1)$ | $P(p = 0|c = 1)$ | $P(p = 1|c = 0)$ | $P(p = 0|c = 0)$ |
|---|---|---|---|---|
| $X_1$ | 0.6 | 0.4 | 0.2 | 0.8 |
| $X_2$ | 0.2 | 0.8 | 0.7 | 0.3 |
| $X_3$ | 0.1 | 0.9 | 0.5 | 0.5 |
| . | . | . | . | . |
| . | . | . | . | . |
| . | . | . | . | . |
| $X_n$ | 0.8 | 0.2 | 0.6 | 0.4 |

Using the probability matrix 'P' derived during the training process; the failure prediction module 122 can predict the probability of the child id 'c' failing or not on the next day. The procedure utilized by failure prediction module 122 can use various settings that define the constraints of the prediction.

For example, the failure prediction module 122 can divide the next 24 hours of the day for which the prediction is divided into t hour interval. Using the information about the parent Id's in this interval, the failure prediction module 122 can apply Bayes' rule to determine the probability of child Id 'c' failing in the next 't' hours. For example, the failure prediction module 122 uses matrix 'P' where n equals to 4, i.e., child id 'c' has 4 parents say '$x_1$', '$x_2$', '$x_3$', '$x_1$', for instance, as illustrated in Table 1. From Table 1, the failure prediction module 122 can set the probability values to $P(x_1=1|c=1)$, $P(x_1=0|c=1)$, $P(x_2=1|c=1)$, $P(x_3=0|c=1)$, etc. As stated above, the next 24 hour interval can be divided into t hour interval and say t equals to 2. For the prediction of the failure of child id 'c' for the time interval between 2 to 4, the failure prediction module 122 can use the data of the parents '$x_1$', '$x_2$', '$x_3$', '$x_1$' for 0-2 hour interval. Based on this, the failure prediction module 122 can determine a probability value for the child id 'c'. The probability of child failing for the next 2 hours can be defined as $P(c=1|(x_1 \ldots x_n))$. In the failure prediction module 122, Bayes' theorem is stated mathematically as the following equation:

$$P(c = 1 \mid x_1 \ldots x_n) = P(c = 1)\left(\frac{P(x_1 \ldots x_n \mid c = 1)}{P(x_1 \ldots x_n)}\right) \quad (4)$$

Using equation (3) and (4), the probability can be stated as $$P(c = 1 \mid x_1 \ldots x_n) = \quad (5)$$
$$P(c = 1)\left(\frac{P(x_1 \mid c = 1)P(x_2 \mid c = 1) \ldots P(x_n \mid c = 1)}{P(x_1 \ldots x_n)}\right)$$

The failure prediction module 122 can solve Equation (5) by feeding the values of '$x_1$', '$x_2$', '$x_3$' and '$x_4$'. For example, the failure prediction module 122 can determine the Latin hypercube sampling (L.H.S.) of Equation (5), which gives the probability value of child id. L.H.S. is a statistical method for generating a near-random sample of parameter values from a multidimensional distribution.

Setting a threshold θ to the probability value of child Id for the next time interval, the failure prediction module 122 can generate a binary value, which indicates whether the failure will happen or not depending upon the threshold value. The failure prediction module 122 can repeat this step until 'z' number of failures are generated. Note that here 'θ' and 'z' are hyper-parameters. In Bayesian statistics, a hyperparameter is a parameter of a prior distribution; the term is used to distinguish them from parameters of the model for the underlying system under analysis.

Then, the maintenance system 106 can schedule, direct, or perform preemptive maintenance 126 of the devices based on the failure prediction. For example, the maintenance system 106 can generate a schedule of preemptive maintenance 126 for the devices (e.g., card reader 110, driver terminal 112, and communication devices 114 on buses 102; fee terminals 104; servers 108, etc.). Likewise, the maintenance system 106 can transmit message to maintenance personal to perform the preemptive maintenance 126 on the devices (e.g., card reader 110, driver terminal 112, and communication devices 114 on buses 102; fee terminals 104; servers 108, etc.). Also, the maintenance system 106 can perform the preemptive maintenance 126 the devices (e.g., card reader 110, driver terminal 112, and communication devices 114 on buses 102; fee terminals 104; servers 108, etc.), for example, install software patches and updates.

In embodiments, the maintenance system 106 can be implemented on one or more processing nodes. For example, the maintenance system 106 can be implemented as an application program that is executed on the one or more processing nodes. The processing nodes can be any type of computer systems that are capable of performing the processes and methods described herein and communicating with the components of the transportation system 100, via one or more networks. In embodiments, the one or more networks can include more public and/or private networks, whether wired or wireless.

For example, the processing nodes can include one or more server computers, one or more desktop computers, one or more laptop computer, one or more tablet computers, one or more mobile devices, and the like. In any example, the processing node can include hardware resources (processors, memory, storage, etc.) and software resources (operating systems, application programs, etc.) to perform the process and methods described herein.

Figure 2:
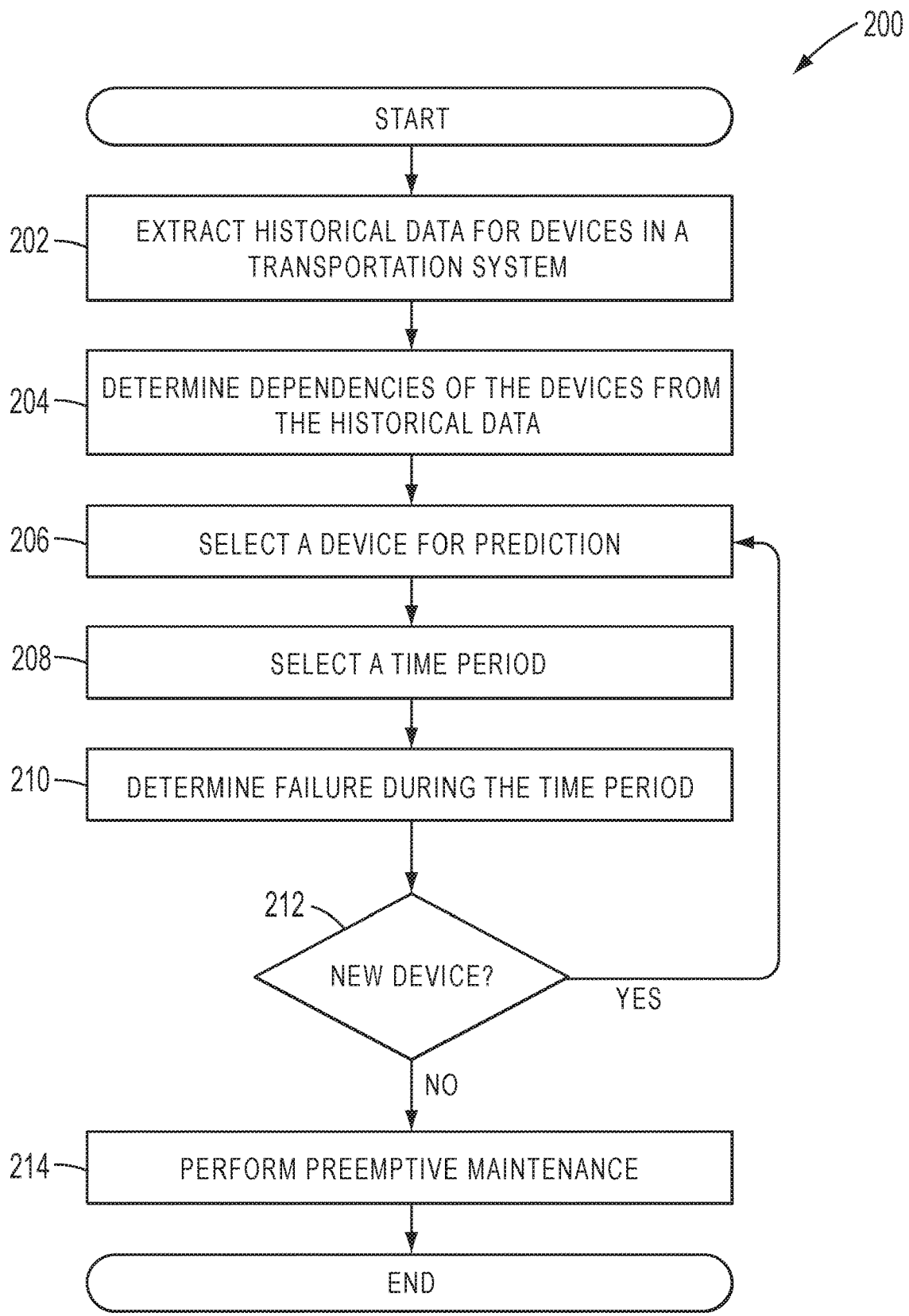
FIG. 2 depicts an exemplary method for predictive failures in devices of transportation system and performing preemptive maintenance, according to various embodiments of the present disclosure.

FIG. 2 depicts an exemplary method 200 for predictive failures in devices of transportation system and performing preemptive maintenance. Although FIG. 2 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

After the process begins, in 202, historical data for devices in a transportation system are extracted. For example, the maintenance system 106 can extract historical data from the database 124. The maintenance system 106 can extract historical data relating operational history of each device (e.g., card reader 110, driver terminal 112, and communication devices 114 on buses 102; fee terminals 104; servers 108, etc.) associated with a unique ID for each device. For example, the historical data can include, associated with the unique ID of each device, a time of a failure, a time of recovery of the failure, a number of hours of the failure, etc.

In 204, the dependencies of the devices are determined from the historical data. For example, the dependency extraction model can generate a directed graph and model of the dependencies, using the assumption described above, from the historical data. Based on this, the dependency extraction module 120, using the model, generates parent-child relationship matrix and probability matrix while training using the historical data For example, the transportation system 100 has 'T' total number of unique Ids in a training set, i.e., the historical data. So, out of 'T', the dependency extraction module 120 can selected 'n' unique Ids say '$x_1$', '$x_2$', . . . '$x_n$', based on the mutual information between unique Ids and a device Id 'c', from the database 124. Here, mutual information (MI) of two random variables is the measure of the mutual dependence between those two variables. The dependency extraction module 120 performs this step to get those IDs which might be influencing or influenced by failure of 'c'. From this step, the dependency extraction module 120 can extract that parent ID's ($x_1$, $x_2$ . . . ) for child ID 'c' which have a MI score greater than some threshold. The dependency extraction module 120 can perform this step for all the IDs present in the database 124 to generate a matrix containing parent child dependencies.

For example, if the transportation system 100 has three devices and the devices can be labeled $x_1$, $x_2$ and $x_3$. In the processes, "parent child relationship" denotes that an outcome of $x_3$ is dependent on values of $x_1$ and $x_2$ if $x_3$ is a child ID and $x_1$, $x_2$ are parent IDs.

In 206, a device is selected for prediction. For example, the maintenance system 106 can select to predict the failure of a device Id 'c'. The device selected can be predetermined. Likewise, the device can be selected by a user of the maintenance system 106.

In 208, a time period is selected. For example, the failure prediction module 122 can select a time period 'm' in the future to predict failure. The time period selected can be predetermined. Likewise, the time period can be selected by a user of the maintenance system 106.

In 210, failure is determined during the time period. For example, the failure prediction module 122 uses the dependencies extracted by above dependency extraction module 120 to predict the failure of devices using Bayesian model. There is a matrix, say 'P', of size n×5 where n is the number of unique parent ids, that is generated during 204 which contains the probabilities of parent Ids failing given child Id 'c's' condition. Using the probability matrix 'P' derived during the training process; the failure prediction module 122 can predict the probability of the child id 'c' failing or not during the time period, for example, the next day or 24 hours.

The failure prediction module 122 can divide the next 24 hours of the day for which the prediction is divided into t hour interval. Using the information about the parent Id's in this interval, the failure prediction module 122 can apply Bayes' rule to determine the probability of child Id 'c' failing in the next 't' hours. For example, the failure prediction module 122 uses matrix 'P' where n equals to 4, i.e., child id 'c' has 4 parents say '$x_1$', '$x_2$', '$x_3$', '$x_4$', for instance, as illustrated in Table 1.

For instance, from Table 1 above, the failure prediction module 122 can set the probability values to $P(x_1=1|c=1)$, $P(x_1=0|c=1)$, $P(x_2=1|c=1)$, $P(x_3=0|c=1)$, etc. The next 24 hour interval can be divided into t hour interval and say t equals to 2. For the prediction of the failure of child id for the time interval between 2 to 4, the failure prediction module 122 can use the data of the parents '$x_1$', '$x_2$', '$x_3$', '$x_4$' for 0-2 hour interval. Based on this, the failure prediction module 122 can determine a probability value for the child id 'c'.

The failure prediction module 122 can solve Equation (5) above by feeding the values of '$x_1$', '$x_2$', '$x_3$' and '$x_4$'. For example, the failure prediction module 122 can determine L.H.S. of Equation (5), which gives the probability value of child id. L.H.S. is a statistical method for generating a near-random sample of parameter values from a multidimensional distribution.

Setting a threshold θ to the probability value of child Id for the next time interval, the failure prediction module 122 can generate a binary value, which indicates whether the failure will happen or not depending upon the threshold value. The failure prediction module 122 can repeat this step until 'z' number of failures are generated. Note that here 'θ' and 'z' are hyper-parameters. In Bayesian statistics, a hyper-parameter is a parameter of a prior distribution; the term is used to distinguish them from parameters of the model for the underlying system under analysis.

In 212, it can be determined if failures are to be predicted for additional devices in the transportation system. If so, method 200 can return to 206.

Otherwise, in 214, preemptive maintenance can be performed. For example, if it is determined that a device 'c' will fail during a time period 'm', preemptive maintenance can be performed to prevent the failure. For instance, the maintenance system 106 can schedule, direct, or perform preemptive maintenance 126 of the devices based on the failure prediction. For example, the maintenance system 106 can generate a schedule of preemptive maintenance 126 for the devices (e.g., card reader 110, driver terminal 112, and communication devices 114 on buses 102; fee terminals 104; servers 108, etc.). Likewise, the maintenance system 106 can transmit message to maintenance personal to perform the preemptive maintenance 126 on the devices (e.g., card reader 110, driver terminal 112, and communication devices 114 on buses 102; fee terminals 104; servers 108, etc.). Also, the maintenance system 106 can perform the preemptive maintenance 126 the devices (e.g., card reader 110, driver terminal 112, and communication devices 114 on buses 102; fee terminals 104; servers 108, etc.), for example, install software patches and updates.

Figure 3A:
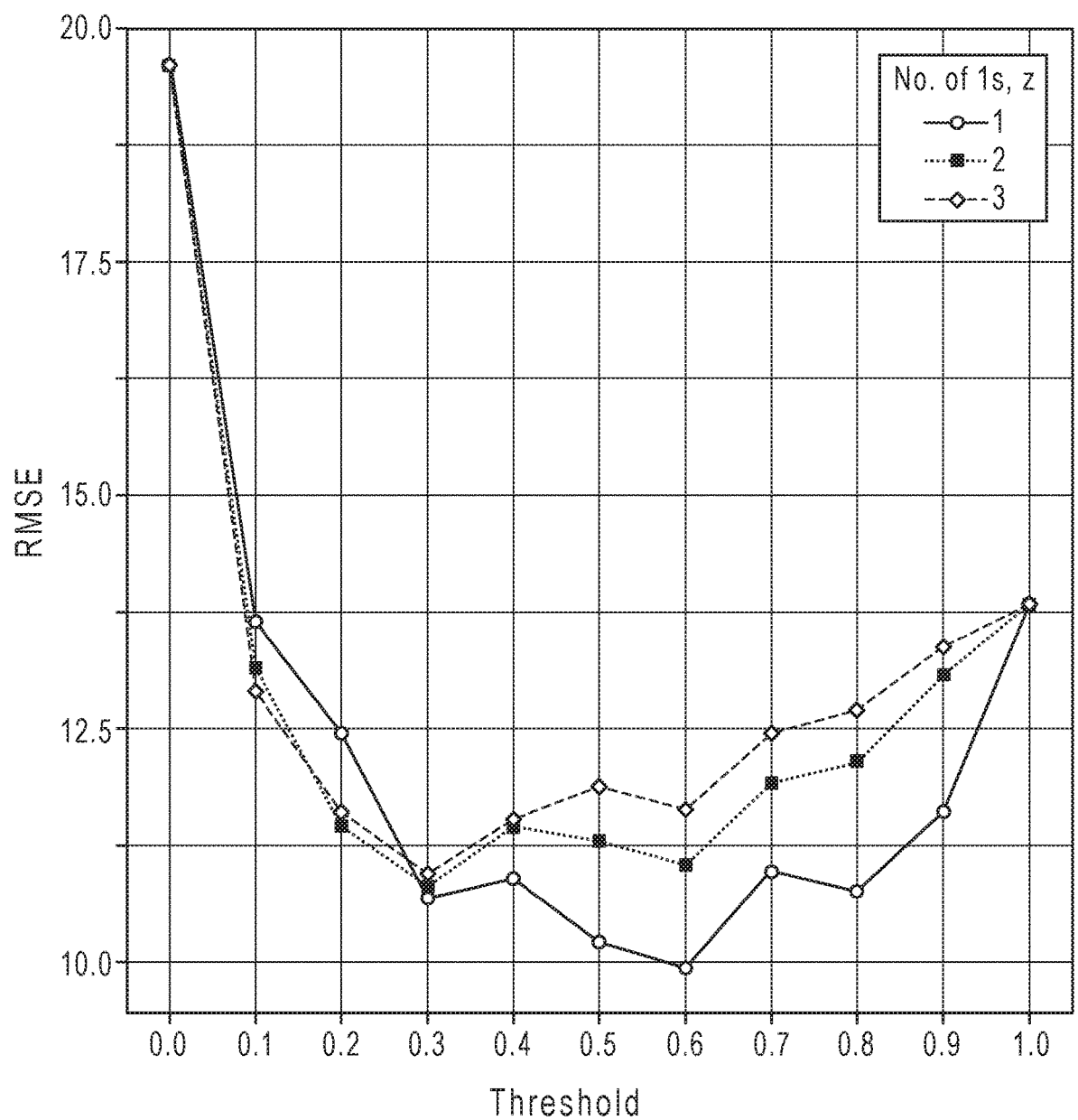
FIGS. 3A and 3B depict an example of experimental test results for the method for predictive failures in devices of transportation system and performing preemptive maintenance, according to various embodiments of the present disclosure.
Figure 3B:
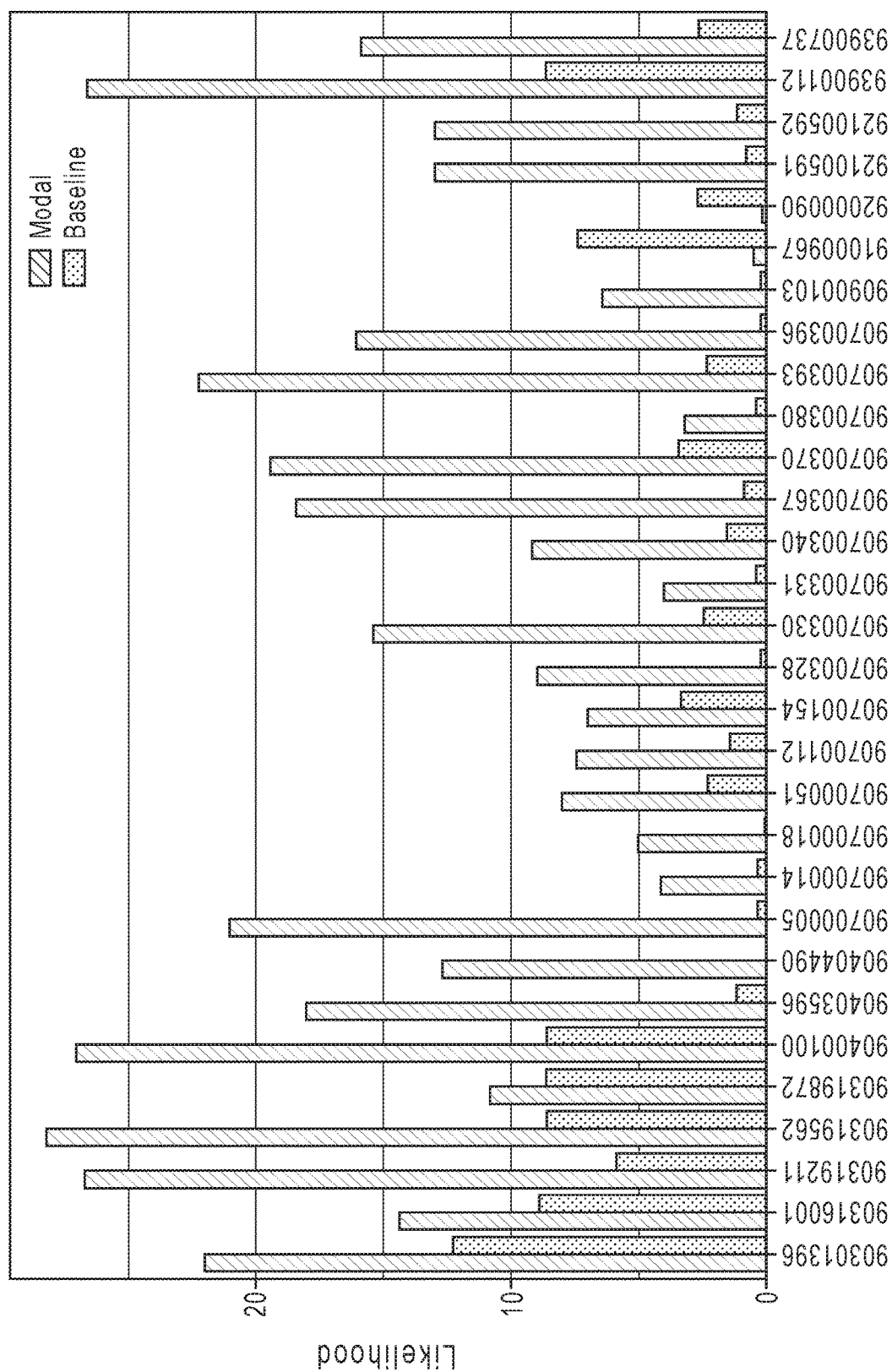

FIGS. 3A and 3B illustrate examples of test results of the method 200 performed on a transportation system in Melbourne Australia. In the experimental test, the maintenance system 106 used the historical data of Melbourne for 3 months starting from November to January. The historical data consists of the devices which have failed at least one time. The timestamps of the failure of the devices are provided at the lowest granularity. There are unique Id's for all the devices and it is called terminal ID. The maintenance system 106 determined a terminal ID's as parent ID and child ID based on the dependencies determined from the historical data. The maintenance system 106 used November data for training the model and building parent-child relationship between terminal Id's. The maintenance system 106 performed testing on January dataset where validation on December. Table 2 illustrates a sub-set of the historical data used by the maintenance system 106.

TABLE 2

| Terminal ID | Update ID | Failure timestamp | Recovery timestamp | Failure hours across shift |
|---|---|---|---|---|
| 90300001 | 8877971 | 1/11/2016 2:39 | 1/11/2016 2:43 | 1 |
| 90300001 | 8930626 | 17/11/2016 09:08 | 17/11/2016 11:27 | 3 |
| . | . | . | . | . |
| . | . | . | . | . |
| . | . | . | . | . |
| 93901203 | 8887286 | 11/11/2016 8:19 | 11/11/2016 8:26 | 0.12 |

In the experimental test, the accuracy of the prediction made by the model was evaluated using root-mean-square error (RMSE). On top of RMSE, the sensitivity and specificity was used as these values will give true positive rate and true negative rate respectively. For prediction, the maintenance system 106 defines the positives as the device failure and negative case as no device failure. So, true positive (TP) is defined as the device failed and the model predicted the same. True negative (TN) is when device doesn't fail and prediction says the same. False positive (FP) is when device doesn't fail but the model's prediction says it does and lastly false negative (FN) is when device failed but model says it doesn't. Sensitivity and specificity are defined in Equations (6) and (7) respectively.

$$\text{Sensitivity} = \frac{TP}{TP + FN} \quad (6)$$

$$\text{Specificity} = \frac{TN}{TN + FP} \quad (7)$$

The root-mean-square error (RMSE) is a measure of the sum of differences between values predicted by a model and the actually observed values. Hence the expression for RMSE is given by:

$$RMSE = \sqrt{\frac{\sum_{n=1}^{T} (\text{prediction} - \text{actual})^2}{T}} \quad (8)$$

where prediction is the model prediction of the device failure and actual is the ground truth of the device of that day and T is the total number of days for which the prediction is done. There are few things that need to be looked at before applying RMSE. Squared error has calculated for each day and then averaged it over the month and then calculates the root of the mean squared. So, during the calculation of squared error each day, here are some of the rules that have been followed. False negative is considered to be 24*24 for squared error calculation and so is the false positive. True negative is considered to be 0 while for calculating true positive; we take the difference between the prediction and the actual first failure of the device.

The maintenance system 106 performed method 200 taking all the children ID's into account which have failed 4 times or more in 3 months November, December and January. This assumption may be used due to the size of the historical data for training. The maintenance system 106 used 3 months data as of availability so the training has been done on November data while the validation and testing is done on December and January respectively.

In our model, the maintenance system 106 utilized two hyper-parameters as stated in the previous section. Those are:

The threshold θ that decides whether the failure has happened or not.

The number of times the child ID has to fail during the prediction stage to claim it as a failure, z.

The value of threshold θ varies from 0 to 1 with the interval of 0.1 including the extremes while the value of 'z' will only take integer value of 1, 2 and 3. maintenance system 106 used the validation model for getting the optimum value of these hyper-parameters.

FIG. 3A is a plot of Threshold vs RMSE for 3 different values of number of times child Id has to fail i.e. z. x-axis represents threshold value and y axis represents RMSE. From the graph, it can be seen that the optimum value of threshold and z are 0.6 and 1 respectively.

The model results of the maintenance system 106 are also compared with a baseline. The difference in both is that the model of the maintenance system 106 considers the parent-child relationship while the baseline does not. The procedure for testing is as follows. During training of Melbourne data, the maintenance system 106 generated a probability matrix (P) which contains 5 columns including parent ID, probability of parent ID failing while child ID does not fail, probability of parent ID failing which child ID fails, probability of parent ID not failing when child ID fails and probability of parent ID not failing when child ID does not fail. The likelihood was used as the basis of the model of the maintenance system 106 comparisons with baseline.

Model's likelihood: Using the matrix P and Bayes rule, the maintenance system 106 generated probabilities of ID failing in the 2 hours interval. The maintenance system 106 evaluated likelihood of child ID failure for each day and then took the average of likelihood over all days of the given months.

Baseline's likelihood: Using matrix P, we have the probability of child ID failing and probability of child ID not failing. These values were used to calculate the likelihood of child ID failure for each day and then took average over the month.

FIG. 3B shows the likelihood calculated using model and using baseline. Y-axis is the likelihood and x-axis represents different ID's of the data-set. As illustrated, model's likelihood is much higher for almost all ID's which shows the importance of parent-child relationship for the prediction of failure of an ID.

Figure 4:
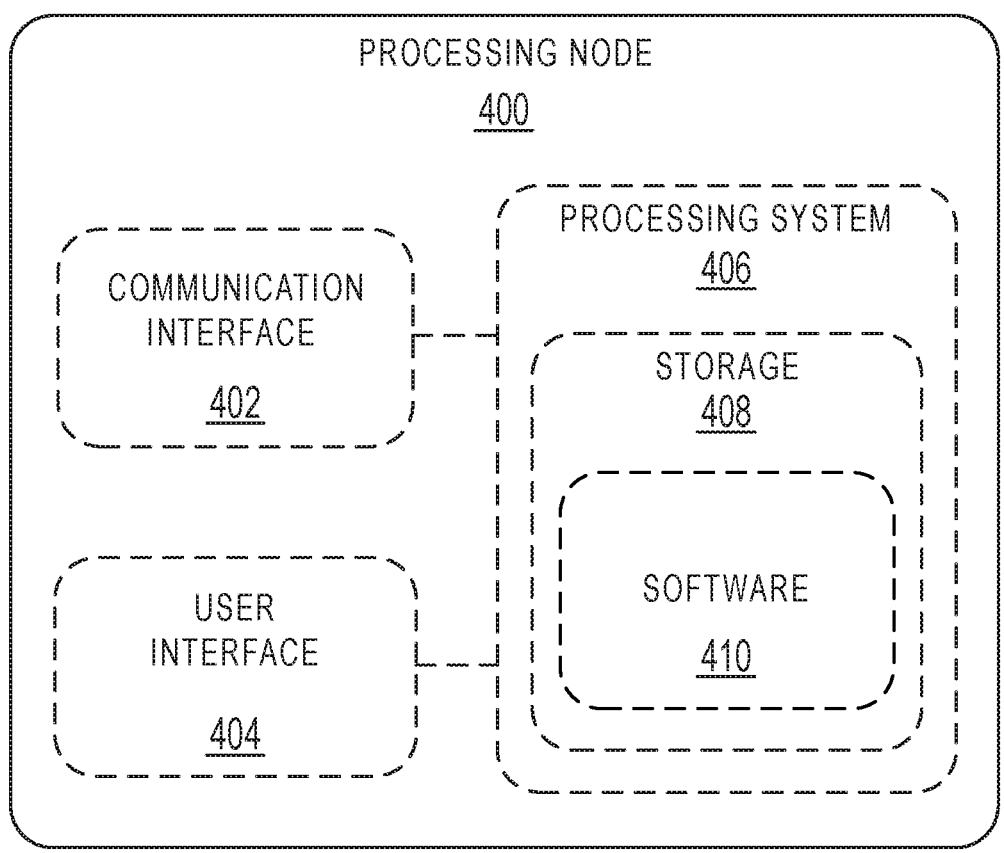
FIG. 4 depicts an exemplary processing node for predictive failures in devices of transportation system and performing preemptive maintenance, according to various embodiments of the present disclosure.

FIG. 4 depicts an exemplary processing node 400 comprising a communication interface 402, user interface 404, and processing system 406 in communication with communication interface 402 and user interface 404. Processing system 406 includes storage 408, which can comprise a disk drive, flash drive, memory circuitry, or other memory device. Storage 408 can store software 410 which is used in the operation of the processing node 400. Storage 408 can include a disk drive, flash drive, data storage circuitry, or some other memory apparatus. For example, storage 408 can include a buffer. Software 410 can include computer programs, firmware, or some other form of machine-readable instructions, including an operating system, utilities, drivers, network interfaces, applications, or some other type of software. For example, software 410 can include the maintenance system 106 described above. Processing system 406 can include a microprocessor and other circuitry to retrieve and execute software 410 from storage 408. Processing node 400 can further include other components such as a power management unit, a control interface unit, etc., which are omitted for clarity. Communication interface 402 permits processing node 400 to communicate with other network elements. User interface 404 permits the configuration and control of the operation of processing node 400.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for predicting and performing preventive maintenance in a transportation system, the method comprising:
   determining historical data for electronic devices in the transportation system,
      wherein the electronic devices communicate in a network in the transportation system, and
      wherein the historical data comprises historical device failures of the electronic devices;
   determining dependencies of the electronic devices based on the historical data, wherein determining the dependencies comprises generating a graph of parent-child dependencies of the electronic devices;

selecting a target electronic device from the electronic devices to predict a fault during a time period;

determining a likelihood of a fault in the target electronic device during the time period based on the dependencies of the electronic devices and a mutual probability of failure of the target electronic device and parent electronic devices associated with the target electronic device; and initiating preemptive maintenance on the target electronic device based on the likelihood of the fault.

2. The method of claim 1, wherein the historical data for each of the electronic devices comprises a unique identifier and one or more dates of previous faults.

3. The method of claim 1, wherein the electronic devices comprise electronic devices for collecting fares in the transportation system.

4. The method of claim 1, wherein determining dependencies of the electronic devices comprises:

generating a model that describes mutual probabilities of links in the graph of parent-child dependencies of the electronic devices; and training the model using a first set of the historical data.

5. The method of claim 4, wherein determining the likelihood of the fault comprises:

applying a second set of the historical data to the model to determine the likelihood of the fault.

6. The method of claim 5, wherein the model is a Bayes model.

7. The method of claim 1, wherein initiating preemptive maintenance comprises:

performing the preemptive maintenance on the target electronic device.

8. A processing node for predicting and performing preventive maintenance in a transportation system, the processing node being configured to perform operations comprising:

determining historical data for electronic devices in the transportation system, wherein the electronic devices communicate in a network in the transportation system, and wherein the historical data comprises historical device failures of the electronic devices;

determining dependencies of the electronic devices based on the historical data, wherein determining the dependencies comprises generating a graph of parent-child dependencies of the electronic devices;

selecting a target electronic device from the electronic devices to predict a fault during a time period;

determining a likelihood of a fault in the target electronic device during the time period based on the dependencies of the electronic devices and a mutual probability of failure of the target electronic device and parent electronic devices associated with the target electronic device; and initiating preemptive maintenance on the target electronic device based on the likelihood of the fault.

9. The processing node of claim 8, wherein the historical data for each of the electronic devices comprises a unique identifier and one or more dates of previous faults.

10. The processing node of claim 8, wherein the electronic devices comprise electronic devices for collecting fares in the transportation system.

11. The processing node of claim 8, wherein determining dependencies of the electronic devices comprises:

generating a model that describes mutual probabilities of links in the graph of parent-child dependencies of the electronic devices; and training the model using a first set of the historical data.

12. The processing node of claim 11, wherein determining the likelihood of the fault comprises:

applying a second set of the historical data to the model to determine the likelihood of the fault.

13. The processing node of claim 12, wherein the model is a Bayes model.

14. The processing node of claim 8, wherein initiating preemptive maintenance comprises:

performing the preemptive maintenance on the target electronic device.

15. A non-transitory computer readable medium storing instructions for causing one or more processors to perform a method for predicting and performing preventive maintenance in a transportation system, the method comprising:

determining historical data for electronic devices in the transportation system, wherein the electronic devices communicate in a network in the transportation system, and wherein the historical data comprises historical device failures of the electronic devices;

determining dependencies of the electronic devices based on the historical data, wherein determining the dependencies comprises generating a graph of parent-child dependencies of the electronic devices;

selecting a target electronic device from the electronic devices to predict a fault during a time period;

determining a likelihood of a fault in the target electronic device during the time period based on the dependencies of the electronic devices and a mutual probability of failure of the target electronic device and parent electronic devices associated with the target electronic device; and initiating preemptive maintenance on the target electronic device based on the likelihood of the fault.

16. The non-transitory computer readable medium of claim 15, wherein the historical data for each of the electronic devices comprises a unique identifier and one or more dates of previous faults.

17. The non-transitory computer readable medium of claim 15, wherein the electronic devices comprise electronic devices for collecting fares in the transportation system.

18. The non-transitory computer readable medium of claim 15, wherein determining dependencies of the electronic devices comprises:

generating a model that describes mutual probabilities of links in the graph of parent-child dependencies of the electronic devices; and training the model using a first set of the historical data.

19. The non-transitory computer readable medium of claim 18, wherein determining the likelihood of the fault comprises:

applying a second set of the historical data to the model to determine the likelihood of the fault.

20. The non-transitory computer readable medium of claim 15, wherein initiating preemptive maintenance comprises:

performing the preemptive maintenance on the target electronic device.

* * * * *